358-86. XR 3,746,780 SR x 358/128 ✓ 86 ✓ x 358/142

United States Patent [19]

Stetten et al.

[11] 3,746,780

[45] July 17, 1973

[54] VIDEO DISPLAY SYSTEM

[75] Inventors: Kenneth J. Stetten, Reston; Rollin P. Mayer, Arlington, both of Va.

[73] Assignee: The Mitre Corporation, Bedford, Mass.

[22] Filed: Feb. 25, 1971

[21] Appl. No.: 118,904

[52] U.S. Cl. 178/6.6 A, 178/6.6 DD, 178/DIG. 13, 178/DIG. 23, 179/2 TV, 340/324 A

[51] Int. Cl. G11b 27/10, G11b 31/00, H04n 5/78

[58] Field of Search 178/6.6 A, 6.6 DD, 178/6.7 R, DIG. 13, DIG. 23; 340/324 A; 179/2 TV

[56] References Cited

UNITED STATES PATENTS

| | | | |
|---|---|---|---|
| 3,539,715 | 11/1970 | Lemelson | 178/6.6 A |
| 3,051,777 | 8/1962 | Lemelson | 178/6.6 A |
| 3,569,617 | 3/1971 | Allen | 178/6.6 DD |
| 3,594,495 | 7/1971 | Bond | 178/DIG. 13 |
| 3,493,674 | 2/1970 | Houghton | 178/DIG. 23 |
| 3,084,213 | 4/1963 | Lemelson | 178/6.6 A |

*Primary Examiner*—Howard W. Britton
*Attorney*—Kenway, Jenney & Hildreth

[57] ABSTRACT

A video information transfer and display system having a plurality of video display devices and apparatus to select for display at particular display devices, on the basis of identification data incorporated within the video signals, predetermined video display information from sequential video signals also received at many other display sites. Video recorders are adapted to record selected portions of commercial television-type video signals and maintain the image displayed on associated television receivers.

2 Claims, 8 Drawing Figures

INVENTORS
KENNETH J. STETTEN
ROLLIN P. MAYER
BY Kenway, Jenney & Hildreth
ATTORNEYS INVENTORS
KENNETH J. STETTEN
ROLLIN P. MAYER
BY Kenway, Jenney & Hildreth
ATTORNEYS

INVENTORS
KENNETH J. STETTEN
ROLLIN P. MAYER

BY Kenway, Jenney & Hildreth
ATTORNEYS

INVENTORS
KENNETH J. STETTEN
ROLLIN P. MAYER

BY Kenway, Jenney & Hildreth
ATTORNEYS

VIDEO DISPLAY SYSTEM

Conventional visual display systems are subject to several limitations. In all presently existing systems a sacrifice has been made in either simplicity of display apparatus or in system flexibility and performance. For example, ordinary commercial television receivers provide satisfactory display upon the TV screen of a cathode ray tube at reasonable costs. On the other hand, every receiver tuned to a given channel containing video information receives and responds to identical video information and thus presents on its TV screen a display identical to that on every other receiver tuned to the same channel. On the other hand, systems permitting selected predetermined displays at particular sites have involved complex specialized equipment. PLATO, a system being developed by the University of Illonois, provides different displays for different users but requires complex digitally-controlled display devices currently under development.

There have been attempts to provide different displays at different sites with simple display devices such as television-type displays. These systems operate with the desired visual information prerecorded on magnetic tape or other recording means. In such systems a given tape or tape cassette contains the video information for a particular display sequence. While such systems do permit different displays at different user locations, they do not provide flexibility in the material displayed, nor do they permit interaction between the viewer and the system. Rather the viewer is constrained to the particular sequence of displays dictated by the totality of the video information recorded on the particular tape or cassette which is being used with that site. In other words, the only choices available to a user are choices between those specific prerecorded tapes physically available to him.

A somewhat similar choice "in bulk" of video information is provided by systems providing for switching between various video channels. A viewer may be able to pick among several channels, but he, and everyone else viewing a TV screen presenting video information carried by that channel, is contrained to the information being transmitted over that channel.

Particularly for certain defense-oriented systems where the user's needs can be particularly well defined so that special purpose systems are suitable, there have been some high-cost data-link systems permitting particular displays at particular receiving sites. These systems normally involve specially coded transmission signals and special purpose display devices. These devices may be storage-type display apparatus giving stylized displays adapted to the particular mission involved. Thus these systems do not solve the problem created by the conflict between low cost and system simplicity versus system performance and flexibility but rather go to high-cost special purpose equipment throughout. Such systems are too costly for educational or other general use display systems in which large numbers of receiving sites must be provided at minimal cost.

Accordingly it is an object of the present invention to permit the display of particular display information addressed for receipt at particular display sites using conventional video display devices and conventional video transmission systems.

Another object is to permit users to select for viewing particular desired displays from many displays transmitted over a single video channel.

Another object is to permit individually selected and adapted displays at many sites through the use of commercially available video equipment with a minimum of special purpose identification and display control apparatus.

A further object is to achieve maximum flexibility and user-system interaction without significantly increasing system cost.

A still further objective it to provide picturephone and document delivery capabilities.

These and other objects are achieved by utilizing conventional video display devices such as the TV screen on the cathode ray tube of a conventional TV receiver and conventional video-tape recorders. The video signals for a particular screen are maintained by recorded video information, the video signals recorded at a particular location being controlled by identification information within otherwise conventional sequential television video signals. The identification information permits individual ones of many television receivers to display on their screens individually adapted, and different, displays from a commonly received, sequential video television signal.

Figure 3:
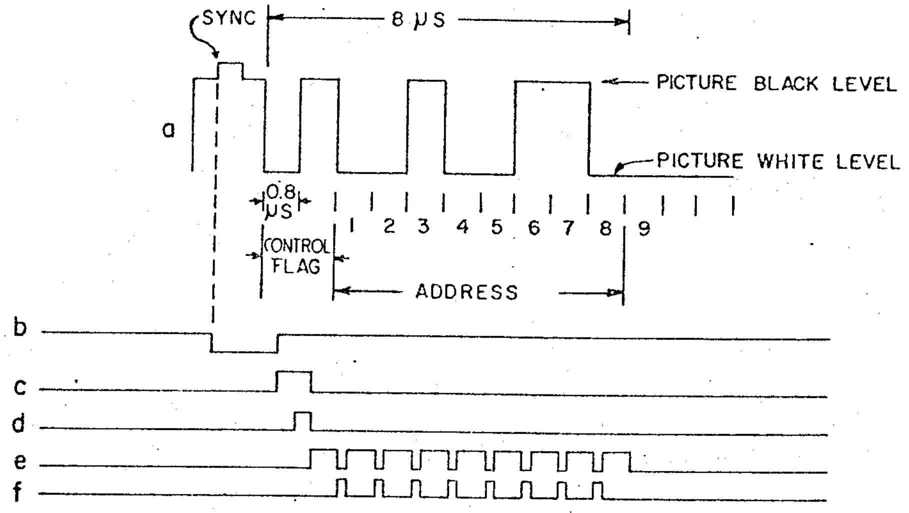
Figure 4:
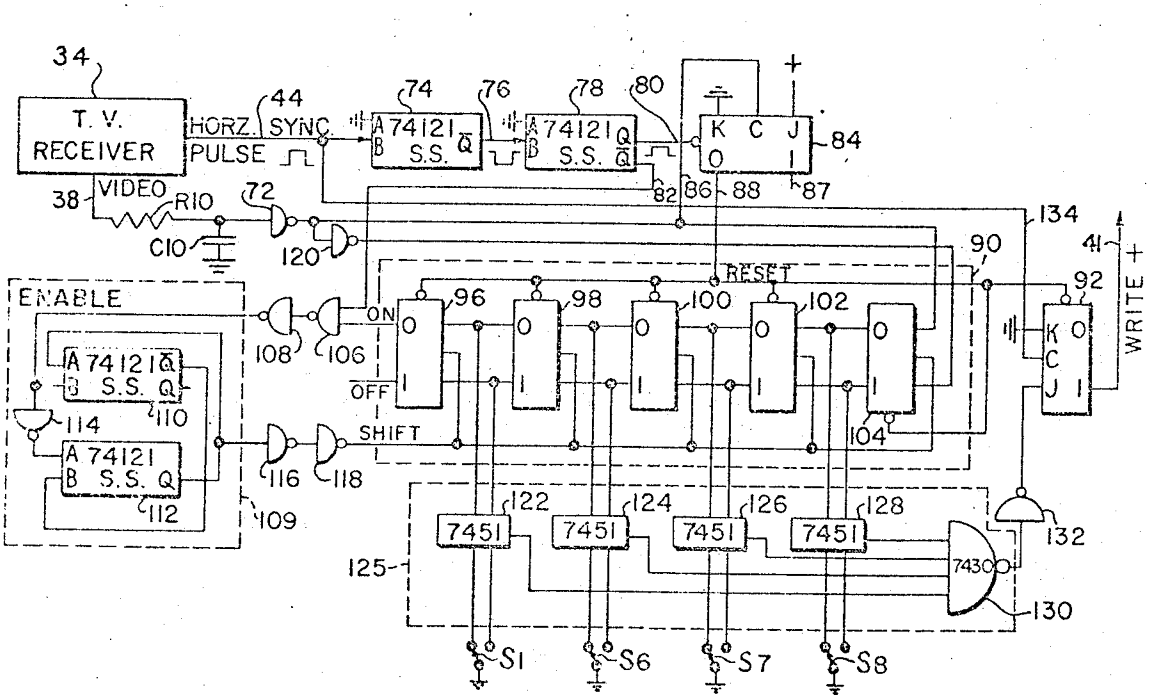
Figure 5:
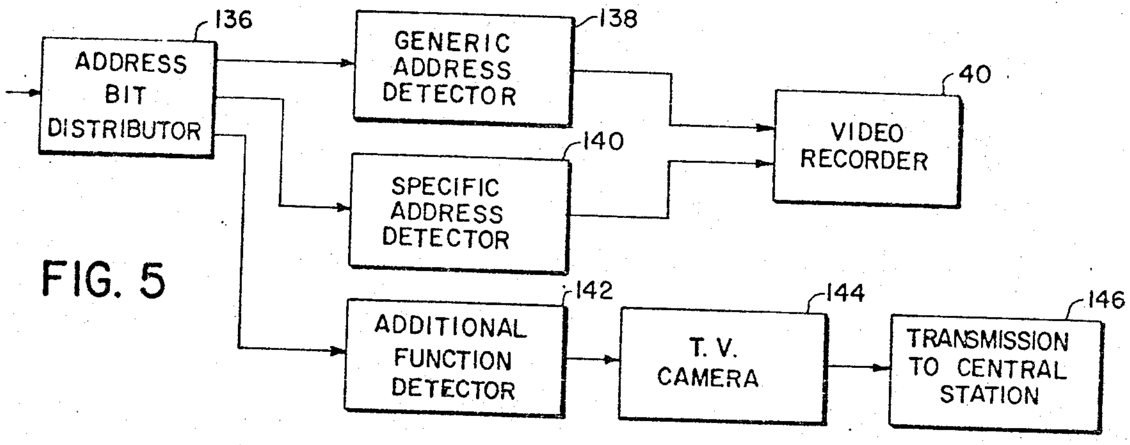
Figure 6:
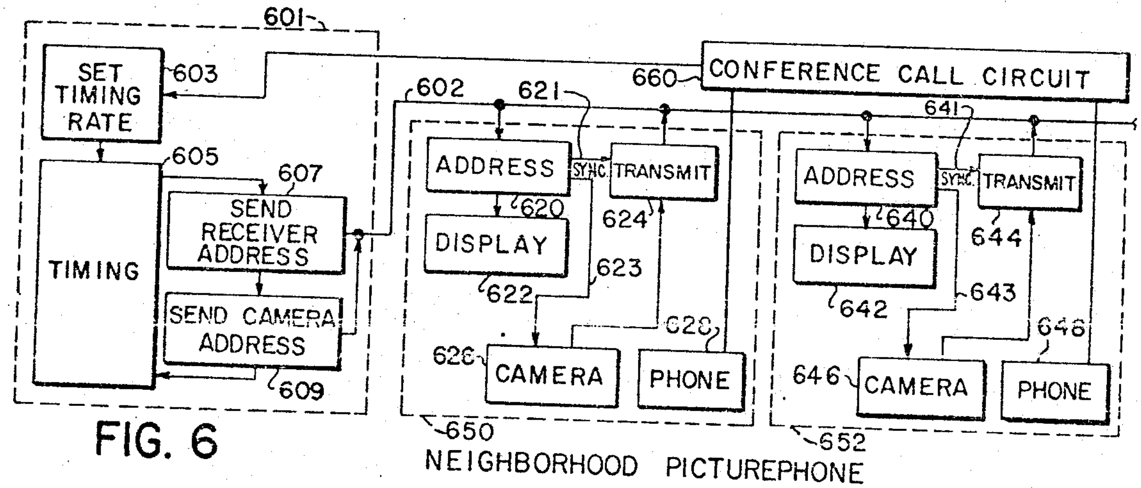
Figure 7:
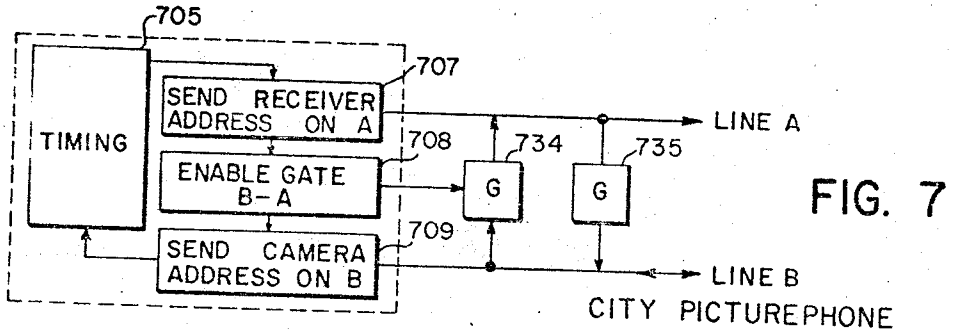

FIG. 3 gives signal waveforms for a coded identification address;

FIG. 4 shows circuitry appropriate to decode addresses at a particular user site;

FIG. 5 is a block diagram of a system wherein a multiple level or cascaded address is used to provide both two addresses and additional function control;

FIG. 6 is a block diagram of a neighborhood picturephone system;

FIG. 7 is a block diagram of an expanded picturephone system; and

Figure 8:
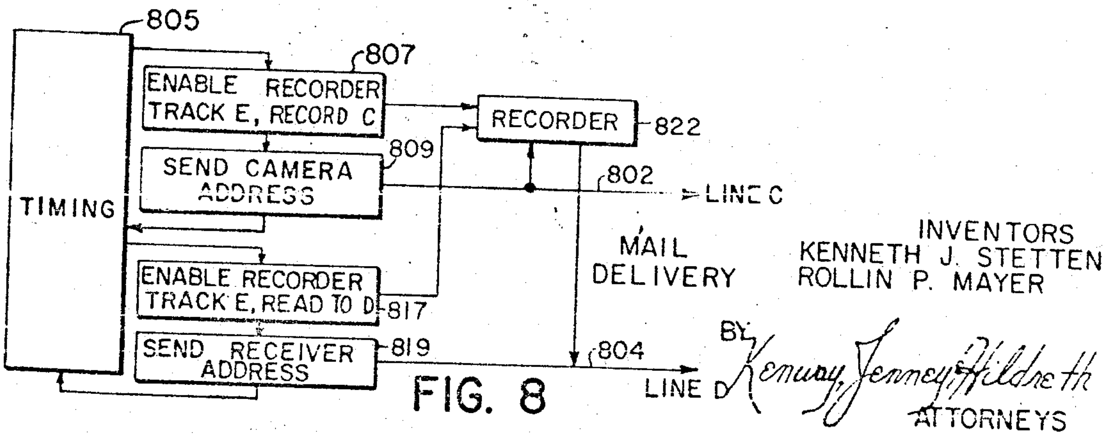

FIG. 8 is a block diagram of a mail delivery system.

Figure 1:
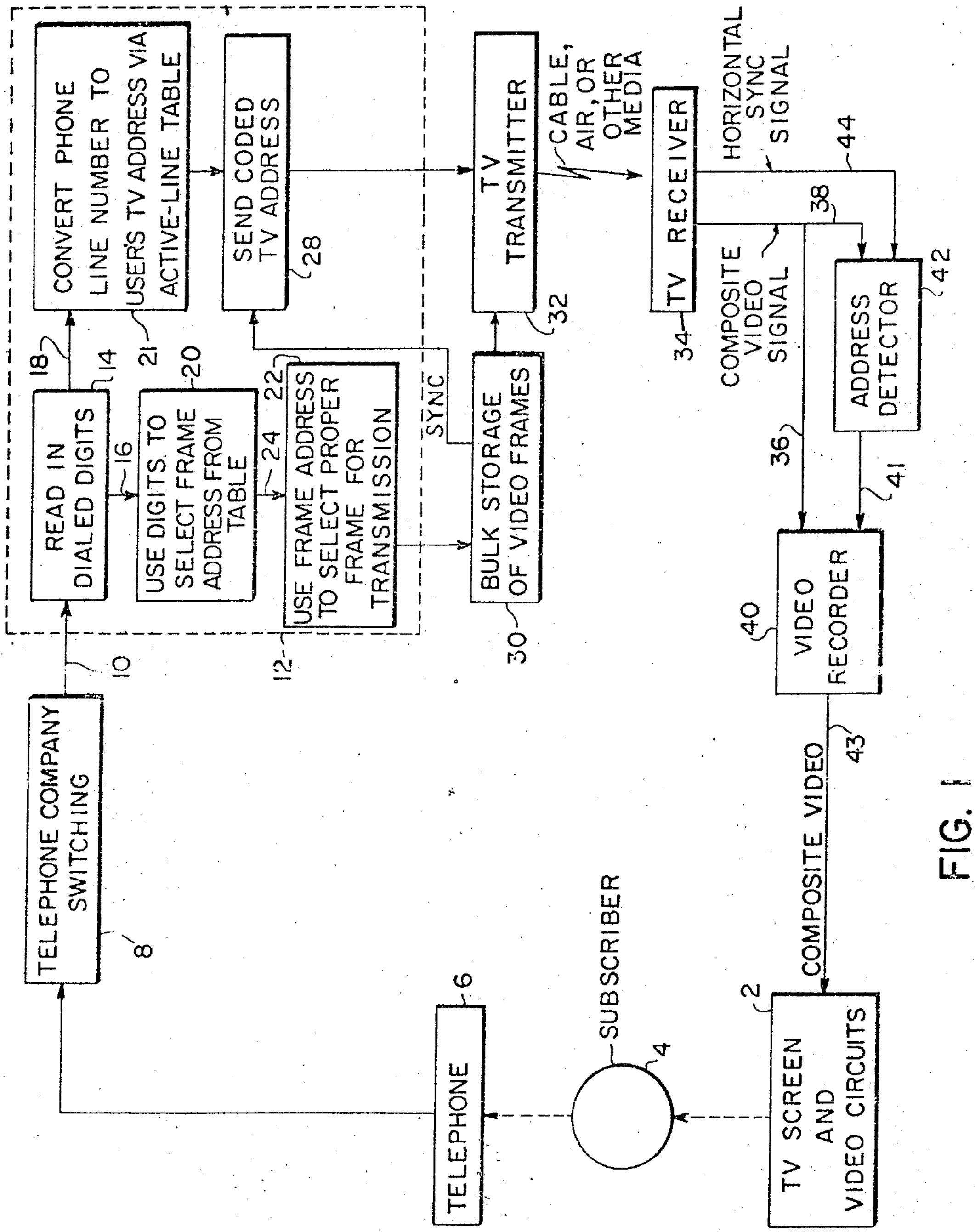
FIG. 1 is a block diagram of an over-all information transfer and display system with user feed-back via telephone communication.

The over-all system for one mode of operation is illustrated in FIG. 1. Television screen 2 is a conventional television cathode ray tube display screen with associated conventional television video circuitry. The subscriber or user 4 observes the image displayed upon screen 2.

By way of illustration, it will be assumed that the subscriber has subscribed to a weather service available from the transmission system. He would now like to see the forecast for northern New England, since he is planning a skiing trip. Accordingly, he turns on his display equipment, described below, and uses his telephone to dial first the television display system to which he has subscribed and, second, the code number for weather information. A conventional telephone 6, preferably the touch-tone version, with conventional telephone company central-station switching 8, provides a telephone dial signal input 10 received by a computer installation 12 serving to control the operation of the system.

In this example there are 10 different services available and the number for the weather service is 5. Accordingly, the number 5 will be received by the computer as a new request. In addition, the subscriber will send a signal identifying him, in this example display location 11. Conventional software, indicated by block 14, reads the received digital information and provides a number for the display frame address over line 16 and for the user address over line 18.

This software is analogous to that used in time-shared commercial services provided by central computing installations to many users via telephone lines. In such systems information fed in over telephone lines is subjected to predetermined computer processing. For that processing, a given program to perform the desired function, such as entering payments to a particular count, is chosen. In an analogous manner the digital information representing the desired display which has been transmitted by the user in the present invention is subjected to software processing indicated by block 20. In this case rather than selecting a particular program for the processing of the user's data particular digital input information is identified with particular frame addresses and stored video information. In a manner analogous to the retrieval of a particular stored program from computer memory, the programming of block 22 utilizes the particular frame address, supplied over line 24, to control the retrieval of the desired display frame from the storage means, block 30.

While a single block 30 is shown, the system employs conventional recording means with associated controls to make available the video information for many different frames on demand. Any conventional video storage means can be employed, as for example, a video disc recorder. If a video disc recorder is being used, the general weather display information is recorded on a particular track of one disc of that recorder, for example, on track 26. Accordingly the operation of the software blocks 20 and 22 will serve to select track 26 when number 5 is dialed. The information on video disc track 26 is then read to the TV transmitter 32. At the start of read-out of this track, the video disc initiates the program in software block 28, using conventional methods of synchronizing software with external equipment. Block 28 has previously been prepared for this activity by software block 21, which has supplied the subscriber's TV address that is to be encoded upon the stored signal. If desired, the user can dial his location number, 11 for example. In either case, utilizing software analogous to that employed to determined user addressing for a time-shared central processing system the user's telephone number, or location number, is converted into a TV address by use of the active line table in block 21. Suitable codes and decoding mechanisms will be discussed subsequently in connection with FIGS. 3 and 4. When software block 28 is thus initiated, it sends the required coded address to the TV transmitter for transmission.

Thus, TV transmitter 32 receives for transmission first the coded address from block 28 and then the video frame from block 30. This transmitter then transmits, via air, cable or any other conventional transmission media, a video television signal to the subscriber's television receiver 34. The composite video signal is fed through lines 36 and 38 to a video recorder 40 and an address detector 42, respectively. The address detector also receives the horizontal sync signal through line 44. When the address of the subscriber's display location 11 is received, a WRITE + signal is delivered to the video recorder 40 over line 41 and the recorder proceeds to record the general weather forecast which has been requested by subscriber 4. The user's video recorder may be a tape cassette, reel-to-reel, or other recorder having the ability to play back single frames, — the so-called "stop-frame" mode, and to record. After recording, the composite video portraying the general weather forecast is sent from the recorder over line 43 to the conventional video circuits controlling the display on the user's television screen 2. As will be discussed in greater detail below, the video recorder 40 repetitively sends the stored frame at the conventional television frame and field rates to maintain the desired display on TV screen 2.

In the example being utilized the subscriber wanted the northern New England forecast. The general weather forecast display contains a list of several text lines giving code numbers the user can dial to obtain more specific weather forecast displays for various areas. Therefore, the subscriber now dials again, giving the number for northern New England and the more detailed display for that particular region is delivered to the subscriber exactly as the general weather display had been processed. The only difference is that a different code number is utilized so that the video information stored on a different track of the video disc is delivered to the subscriber, as determined by software block 20, which uses conventional table and coding techniques to match the customer's present code number with his new request number to derive the new desired track number.

If every individual subscriber on the average would like a different display as often as every ten seconds, displays with full television frame detail can be delivered to three hundred different subscribers over a single television channel. This result is obtained by multiplying the number of television frames per second in a conventional transmission, 30, times the number of seconds, 10, to give the number 300.

A conventional television frame is composed of two fields, each field containing one-half of the lines of the television picture, alternate lines appearing in each field. If the detail required is not greater than that given by a single field, twice the number of subscribers can be handled with the same frequency of display change. Blank lines of the screen can be avoided merely by making each line for the missing field identical to the preceding line from the transmitted field, as is commonly done in stop-frame playback from conventional video tape recorders.

Figure 2:
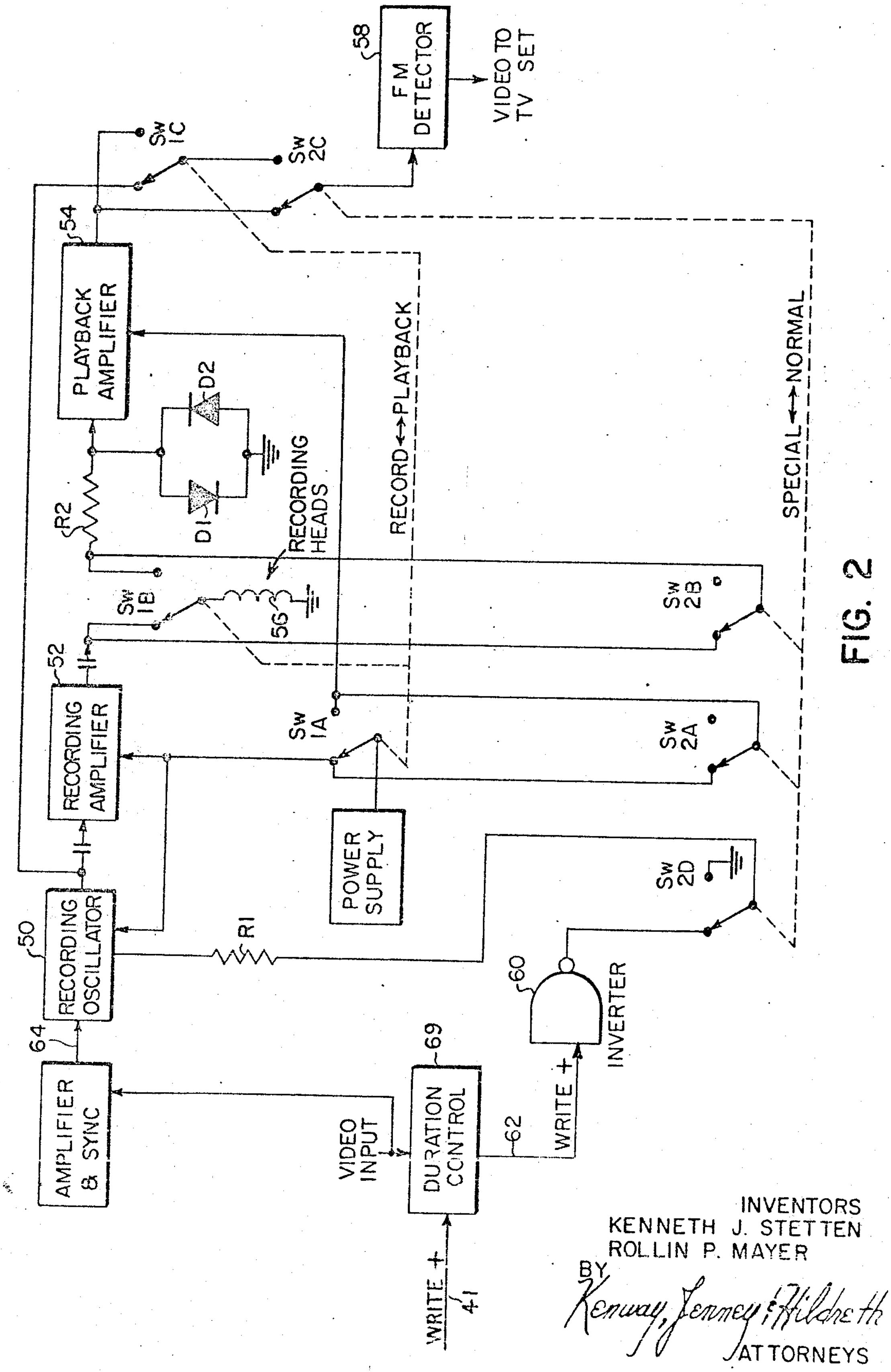
FIG. 2 shows circuit modifications to adapt a commercial television cassette recorder for use with the present invention.

FIG. 2 sets forth in block diagram form circuitry appropriate for a video tape recorder modified to be useful in the system of the present invention. Conventional circuitry for normal operation is not shown, including circuitry for synchronizing the heads to the incoming signal, other controls for normal operation, and so forth. If the synchronization of the heads to the incoming signal is maintained even while the output of the tape recorder is the recorded signal rather than the incoming signal, the incoming signal to be recorded in response to control signals to be described below will already find the heads synchronized properly. If the four switches which have been added to a normal video tape recorder, switches Sw2A, Sw2B, Sw2C and Sw2D, are in the right-hand or "normal" position, the recorder functions in its normal unmodified manner. In this mode switch Sw1A supplies power to the recording oscillator 50 and the recording amplifier 52 or to the playback amplifier 54, depending upon the switch position. As shown in FIG. 2, the switches are set for the recording mode. Thus power is supplied to the recording oscillator 50 and the recording amplifier 52 but not to the playback amplifier 54. Sw1B connects the recording heads 56 to the recording amplifier but not to the playback amplifier. Sw1C does not connect the playback amplifier to the FM detector 58 but does connect the FM detector 58 to the recording oscillator 50 so that the video input may be monitored.

With the additional manual switch, Sw2A, B, C, D, in the "special" position for use with the present invention Sw2A applies power to both the recording amplifier 52 and the playback amplifier 54. Sw2B connects the recording heads 56 to both the recording amplifier 52 and the playback amplifier 54. Sw2C connects the FM detector 58 to only the playback amplifier 54. Sw2D connects the recording oscillator 50 to a conventional inverter 60 serving as a control circuit for the present invention. This control circuit is activated by a "WRITE +" signal on line 62.

In the absence of a WRITE + signal the line 62 is at ground level signifying a "READ" operation. With a ground level input the output of the inverter 60 to Sw2D is positive, typically 4 volts. This positive voltage is applied through resistor R1 to recording oscillator 50 to place the oscillator in an inoperative state. This operation may be achieved in any conventional manner, for example, by raising the voltage level of the emitters of the recording oscillator to cut off its transistors. With the recording oscillator cut off there is no input to the recording amplifier 52 and no output from the recording amplifier 52 to the recording heads 56.

In the special mode Sw2B connects the playback amplifier as well as the recording amplifier to the recording heads 56 so that the recording heads will play back the frame recorded, if any, on the section of tape being traversed by the heads. A resistor diode network comprising R2 and the diodes D1 and D2 has been added to the input side of the playback amplifier 54 and causes negligible attenuation of the weak playback signal. Thus the playback of the recorded frame occurs in the conventional manner.

When the WRITE + signal is applied to the control inverter 60, the input of the inverter is raised, typically to plus 4 volts. The output of the inverter is then at ground level so that the recording oscillator is connected through R1 to ground and functions normally in the manner of an unmodified video tape recorder. With the recording oscillator 50 functioning, the incoming video signal over line 64 is recorded, the recording operation through recording heads 56 occurring in the conventional video tape recorder manner. The resistor diode clipping circuit formed by resistor R2 and diodes D1 and D2 serves to greatly attenuate the strong signal being applied to the recording heads 56 so that the signal applied to playback amplifier 54 is comparable in strength to the signal normally received on playback from the recording tape through recording heads 56. Therefore, this signal may safely be applied to the playback amplifier 54. The output from the playback amplifier 54 is applied through Sw2C to FM detector 58 to permit the immediate display of the video signal being received.

If the user desires to save the recorded video information for later use, the tape may be advanced manually, or automatically, before recording different video information. Similarly, periodic advancement of the tape may be desirable to minimize wear of the magnetic tape which might otherwise be caused by motion of the recording heads.

Since the action of the inverter 60 controlling the operation of the recording oscillator is under electronic control, depending upon the present or absence of a WRITE + signal on line 62, recording may be initiated and terminated at will. For example, if conventional television video is being transmitted, that is video with thirty frames per second, each frame being composed of two interlaced fields, the WRITE + signal may be turned on and off at any number of places during the transmission of a single frame. Therefore, if desired, only a predetermined group of the lines composing a field of video information may be recorded. If it is anticipated that users will often wish a given duration of recording, duration control 69 may be added to the WRITE + input. This circuitry consists of a conventional latch circuit designed to turn off the WRITE + signal when one vertical synchronization signal has occurred if recording of a single field is desirable, or when two vertical synchronization signals have been received if a full frame of recording is desired.

If the recording head synchronization circuits in the video recorder are accurate enough to maintain horizontal sync coherence, as is normally the case with studio or high quality units, recording may be started and stopped at any line on the screen without destroying the lines above or below. Otherwise, horizontal synchronization will be disturbed whenever a switching occurs, and it will be more satisfactory in some applications to switch only at the top or bottom of the screen.

FIG. 3 shows coded waveforms suitable for use in the present invention. The waveform of one line of television video is shown at a in FIG. 3. The first 8 microseconds of the picture line, which is about 52 microseconds of picture data between sync pulses, is divided into ten segments, each 0.8 microseconds long. Each segment is thus more than six picture-elements wide, and the maximum frequency is the reciprocal of a two-segment period, or 625 kilohertz, a frequency which is well within the bandwidth of conventional TV transmitters and receivers. Each segment serves to transmit one bit of identification data and is either at the picture black level, (which is a higher amplitude of carrier modulation in U.S. standards), or at the picture white level, (lower amplitude). The first two bits of the 10 segments serve as a control flag, and the remaining eight bits are coded to transmit the identification data. The two bits of the control flag are coded white-black as shown in waveform a of FIG. 3. Therefore, every picture line that is not to be an address code can begin with the first 1.6 microseconds all black or all white so that picture display information will not be mistakenly utilized as identification data. The effect of treating the first 1.6 microseconds in this manner is to produce a 3 percent left margin, a margin which is normally off the screen in any event. Thus any line of any field of television video information may be identified as an address control line simply by transmitting a control flag and code data on that line. The remaining waveforms shown in FIG. 3 are utilized in conjunction with the description of the circuit of FIG. 4.

FIG. 4 shows circuitry appropriate to decode addresses in the system of the present invention. The NAND circuits, inverters and flip-flops used in this circuit are conventional ones such as those found in integrated circuit flip-flops SN74107, inverters SN7404, NAND gates SN7400, eight-input NAND gates SN7430 and AND/OR comparator integrated circuits SN7451 produced by Texas Instruments, Inc. or their equivalents. Also used is a single-shot (or one-shot) mono-stable multivibrator labelled 74121 S.S. which is the integrated circuit No. SN74121 produced by Texas Instruments, Inc. or its equivalent. Such multivibrators can be installed and adjusted to provide any of a wide variety of pulse-width outputs (30 nanoseconds or more) in response to an appropriate input.

The front end of the TV receiver 34 supplies two conventional signals to the following portions of the circuit of FIG. 4: a horizontal sync pulse over line 44 and a composite video signal over line 38. In this example, the voltage levels are 4 volts positive for black video signal and 0 volts for white video picture signal. A low-pass filter R10C10minimizes noise transients while providing reasonable transient response during the address control signal. Inverter 72 serves as a buffer and wave shaper to deliver a digital signal of standard form to the remainder of the circuit. This digital signal closely follows the bit pattern transmitted as the control flag and address code.

The horizontal sync pulse on line 44 is fed to input B of single-shot multivibrator 74. Since the input A of multivibrator 74 is grounded, the multivibrator will fire when the pulse on input B becomes positive. At that time, its output $\overline{Q}$ will go low and remain low for the time period for which the single-shot multivibrator 74 has been adjusted, as shown on waveform b of FIG. 3. This low output on line 76 is fed to the B input of single-shot multivibrator 78. Thus the output of multivibrator 78, which also has its A input grounded, will go high on line 80 at the end of the $\overline{Q}$ signal on line 76, and stay high for a period equal to the period for which single-shot multivibrator 78 has been adjusted, as shown on waveform *c* of FIG. 3.

The function of single-shots 74 and 78 is to provide signals indicative of when to sense for the transient from white to black of the control flag waveform shown in waveform a of FIG. 3. The period of single-shot 74 is adjusted to control the beginning of the sensing operation, this control being provided by the start of the high-level pulse on line 80. The period of single-shot 78 is adjusted to control the end of the sensing operation, this control being provided by the end of the high-level pulse on line 80. This signal over line 80 is applied to the clear (reset) input of flip-flop 84. Thus flip-flop 84 is forced to 0 at all times except when sensing is to occur as permitted by the signal over line 80 from the Q output of single-shot 78. The output from inverter 72 is fed over line 86 to flip-flop 84. If a white-to-black transient, a down transient on line 86, occurs during the interval that flip-flop 84 is operative for sensing, the KJ input terminals, supplied by fixed ground and positive inputs respectively, are clocked into the flip-flop 84 and its output is at the ONE condition until line 80 again goes low. The waveform at the output of flip-flop 84 (on line 87), when a control flag has occurred, is shown as waveform d in FIG. 3.

If flip-flop 84 detects a control flag, and, therefore, momentarily contains a ONE, the following activity occurs. The zero side of flip-flop 84 connected to line 88 momentarily goes down to the zero level and, therefore, resets all the flip-flops in the shift register 90 and resets flip-flop 92 since their reset terminals are connected to the zero output of flip-flop 84 over line 88. When flip-flop 92 is reset, its output, the WRITE + signal on line 41, goes to zero. Therefore, writing as shown in FIG. 2 stops so that the recorder 40 will not record the address code bits. Thus address code bits are not visible on the user's TV screen.

When the first flip-flop of shift register 90, flip-flop 96, is reset by the output from flip-flop 84, it initiates receipt of the address code, serving as a start-stop control for the shift register. Flip-flop 96 is turned on, —set to zero, by the reset pulse from line 88. Flip-flop 96 remains set to zero while the contents of flip-flops 98, 100 and 102 (but not 104) are successively shifted into it as described below, because these flip-flops have been reset to zero by the signal from flip-flop 84. For circuit simplicity only flip-flops for four bits are shown, although for the code of FIG. 3 four additional flip-flops identically connected in series are required. Flip-flop 96 is turned off, —set to ONE, when the contents of flip-flop 104 is finally shifted into it, because flip-flop 104 has been reset to ONE by the signal from flip-flop The zero side of flip-flop 96 is connected to NAND gate 206. Since flip-flop 96 is normally off, this input to NAND gate 106 is normally low, and consequently the output of inverter 108 is normally low. A high output from inverter 108 is the enabling signal for a conventional oscillator consisting of single-shot multivibrators 110 and 112 and inverter 114. However, since inverter 108 is low, the oscillator is not active, and both Q outputs from the multivibrators 110 and 112 are low. Now when flip-flop 96 goes "on" as a result of flip-flop 84 having detected a control flag, it would "enable" the oscillator 109, except that this enabling is temporarily inhibited by the other input to NAND gate 106 coming from the $\overline{Q}$ of multivibrator 78. Single-shot multivibrator 78, in addition to controlling the period for sensing the control flag, thus also controls the starting of the oscillator 109. Therefore, single-shot 78 has its period adjusted so that, in conjunction with the timing of single-shot 74 and the horizontal sync signal, it will turn off its "Q" output (and thus turn on its $\overline{Q}$ output) at approximately the center of the second bit position of the control flag. Turning on the $\overline{Q}$ output of single-shot 78, will enable the oscillator 109 and oscillator 109 will then sense the approximate center of the succeeding bit positions of the address as described below.

Thus the oscillator 109 will be enabled at the center of the second flag bit if a flag has occurred. Since single-shot 78 will not be triggered again during the receipt of the address bits, the oscillator 109 will remain enabled until the flip-flop 96 is turned off.

The oscillator 109 is a conventional circuit for single-shot multivibrators such as the SN74121 integrated circuits. The operation is as follows. Single-shot multivibrators 110 and 112 each fire when their A and B inputs first become low and high, respectively. When inverter 108 inhibits the oscillator, it does so by holding the B input to single-shot 110 low thus inhibiting the start of a new output from single-shot 110, and via inverter 114 holding the A input of single-shot 112 high thus inhibiting the start of a new output from single shot 112. Conversely, when inverter 108 enables the oscillator, it does so by holding these same two inputs in their "on" position continuously, thus allowing the other two inputs, A of single-shot 110 and B of single-shot 112, to function.

In the quiescent state, both single-shot 110 and single-shot 112, are "off". That is, their Q outputs are low, and their $\overline{Q}$ outputs are high. Because the Q of single-shot 112 is connected to A of single-shot 110, single-shot 110 is ready to fire as soon as inverter 108 enables it. Because $\overline{Q}$ of single-shot 110 is connected to B of single-shot 112, single-shot 112 is ready to fire as soon as inverter 114 enables it, but one purpose of inverter 114 is to delay the enabling signal very briefly until single-shot 110 has fired, thus shutting off B of single-shot 112 so that single-shot 112 does not fire immediately, but waits until the period of single-shot 110 is over. Because of these interconnections, single-shot 110 fires first. When its period is over and it expires, it fires single-shot 112. When single-shot 112 expires, it fires single-shot 110 and so on, until the enabling signal from inverter 108 is turned off, so that the subsequent expiration of single-shot 110 (which will be on at that time, as discussed below) will not fire single-shot 112 and both single-shots remain off. Waveforms *e* and *f* of FIG. 3 show the waveforms at the Q outputs of single-shots 110 and 112.

The period of single-shot 112 is adjusted to be very short, typically 30 nanoseconds, so that it can be used to sense only a specific short position of the video input. The period of single-shot 110 is adjusted so that the sum of the periods of the two single-shots, in other words the over-all period of the oscillator 109, is the same as the bit period of the address bits on the incoming video signal. Thus, since single-shot 78 is adjusted as described above to start the oscillator in the center of the second bit position of the control flag, the first 30 nanosecond pulse and succeeding pulses from single-shot 112 will occur in the center of succeeding bit positions of the address.

Flip-flops 96, 98, 100, 102 and 104 are connected as a conventional shift register. (As noted above, four flip-flops have been omitted from the drawing for circuit simplicity). Each pulse from single-shot 112 Q output is fed to inverters 116 and 118 in series. Inverters 116 and 118 serve to provide isolation and supply the driving pulses for the shift register 90.

Each successive pulse from inverter 118 shifts the bits in the shift register one place to the left, and at flip-flop 104, senses the current address bit of the incoming video signal (which appears at inverter 72 in positive form, and at inverter 120, fed by inverter 72, in complement form) and copies that incoming address bit into flip-flop 104. Thus at the end of the first shift pulse from single-shot 112, the first bit of the address appears in flip-flop 104, flip-flop 102 contains the one bit that will subsequently be shifted into flip-flop 96 to turn off the oscillator, and the remaining flip-flops all contain zero. At the end of the eighth shift pulse from single-shot 112 (the fourth shift pulse for the circuit as drawn with four flip-flops omitted), the eighth bit of the address appears in flip-flop 104 and the other bits of the address have been shifted into the corresponding adjoining flip-flops. Flip-flop 96 will have just received the ONE, thus disabling the oscillator, which will become quiescent as soon as single-shot 110 expires, and no further shifting or sensing occurs.

The outputs from the flip-flops of the shift register 90 along with corresponding outputs from selection switches S1 through S8 are connected to the comparison circuitry 125 consisting of 7451 comparison circuits 122, 124, 126 and 128, and the eight-input NAND gate 130. The switches are set to the address identification code of the particular user.

While shown as simple two-position manual switches connecting one of two comparison circuit terminals to ground, the switches may take any of a number of other forms. Some such forms are: They may be permanently wired connections to the subscriber's TV set and the computer can consult a table that relates the subscriber's name or security code with his coded address number. They may be contacts on a rotary switch that the subscriber may set to any number which he is told to use, or the subscriber may dial any of several publicly listed numbers for receiving publicly broadcast coded frames. They may be electronically controlled by means such as those currently being described, permitting the computer of the system of FIG. 1 to send a primary coded address, detected by manual switches, followed by a "key number" that is used to set the electronic address switches. Thus many subscribers can have their electronic switches automatically set to the same key number, and, therefore, the computer can use this key number as a subservient coded address to transmit a given often-used frame only once to all these subscribers. In a similar manner, the computer could transmit a sequence of commonly used frames at regular intervals identified by subservient coded addresses, and then send the subscriber's primary code and the key required to set the subscriber's electronic address switch to receive the required one of these common frames, or to receive a specially prepared frame. In this manner, 500 subscribers, for example, could be controlled during just one frame time in which 500 flagged address lines containing keys are sent during 1/30 of a second.

In accordance with the conventional operation of the comparison circuit, if each of the switches S1 through S8 matches the corresponding address bit in the flip-flops of shift register 90, then each input to NAND circuit 130 will be high and the low output of NAND circuit 130 will indicate an exact match. Otherwise, at least one flip-flop will not match the corresponding switch, and the high output of NAND circuit 130 will indicate disagreement or mismatch. Thus, because of inverter 132, the J input of flip-flop 92 will be high only if the received coded address, as stored in the shift register 90, agrees with the desired address as represented by the selection switches. Thus a WRITE + pulse will subsequently be delivered to line 41 only when there is an address match, as described below.

As described above, flip-flop 92 was reset to zero by the detection of a control flag. It will remain reset until the occurrence of the next horizontal sync pulse from line 44 which is applied to its clock input over line 134. At this time, if the previously received address is the desired address, the J input to flip-flop 92 will be high and the horizontal sync pulse will clock flip-flop 92 to a ONE, thus turning on the WRITE + signal, to initiate recording the desired display information. Succeeding horizontal sync pulses will not disturb flip-flop 92 because the K input is permanently off and the state of the J input is immaterial because flip-flop 92 will either remain undisturbed, if J is also off, or will remain ONE if J is high.

Consequently, when the subscriber's address is received, writing will start at the beginning of the next horizontal line, and writing will continue until a new address is sent, as signaled by its control flag, at which time writing will stop. If the new address is not for the subscriber, then wiring will not be resumed. No further writing will occur unless either a coded address is received which matches the address of the address selection switches, or the address selection switches are changed to match the last received address stored in shift register 90.

Any conventional method of transmitting the encoded enabling signal from its source to the subscriber's recorder may be employed. Moreover, this control signal can be employed in conjunction with any video line available to a given display site so that specific TV frames, or portions of frames can be recorded in response to these control signals. These operating modes permit either the user, or sender, or both to exercise partial or complete control over the manner in which the control signals will be used to select some frames, or portions of frames for display, and reject others, if any.

Thus although the described example makes use of a binary coded subscriber address, sent as an 8-microsecond part of the TV video signal, the system could use other control signals, such as signals sent separately from the TV signal, as, for example, over telephone lines to the subscriber or user, or be based upon the selection of one or more of a set of sequentially ordered frames counted or timed from a reference signal sent from the source, or available to both the source and the receiver. Address codes could be transmitted at any fixed or specified bit rate during any portion of the TV frame, or sent, for example, on a different carrier or subcarrier, and encoded in binary or other code mechanisms. While a single address mode has been described in detail, cascaded addresses could be used to allow a subscriber's equipment to capture a subsidiary control signal which is then used to control signal recording or to perform some additional function.

FIG. 5 illustrates a system wherein a multiple level or cascaded address is used to provide both two addresses and additional function control. In the system of FIG. 5, address bit distributor 136 separates the portion of the multiple-level address into three component parts. These component parts, that is the bit signals comprising the respective portions of the cascaded address, are fed respectively to generic address detector 138, specific address detector 140, and additional function detector 142. These detectors function in a manner analogous to that described in connection with the circuit of FIG. 4, each working on its respective portion of the cascaded signal. The address bit distributor 136 can comprise any conventional method of distributing portions of a signal, as, for example, a shift register with the stages comprising each of three successive portions of the shift register being fed to the respective detectors.

If either the generic detector 138 or the specific address detector 140 indicates a match, the video recorder 40 will be enabled. If additional function detector 142 indicates a match, then the equipment controlled by that detector will be enabled. In the example of FIG. 5, the additional function is the operation of TV camera 144. Thus, for example, when the sub-address appropriate to provide a match at additional function detector 142 is received, a TV camera will be activated and the picture signal from the camera will be transmitted to the central station as indicated in block 146. In a cable TV system, this transmission can be on the cable on a frequency reserved for such feedback from the subscribers, or can be on the same frequency as the central transmitter, which can be turned off during the receipt of this requested camera frame. The central station can relay this frame to the proper destination by, in some cases, merely transmitting the address code of the destination as the frame begins. Alternatively, the central station can record the image in either analog or digitized form for transmission to the destination at a later time. Thus within the parameters discussed earlier, that is 600 users, this system could provided pictures updated as often as once every 10 seconds from each of 600 sites and might be used in a picturephone or mail delivery system which provided pictures of the sender or of some item whose image the sender wished to transmit.

The picturephone and mail delivery systems may be further described by referring, first, to FIG. 6, which shows a neighborhood picturephone system. The equipment within block 650 is located with one subscriber, and the equipment within block 652 is located with a different subscriber. Each subscriber has an address detector, 620 and 640, respectively, that functions as the TV receiver 34 and address detector 42 of FIG. 1, the address detector being organized as shown in FIG. 5. As shown in FIG. 1, the receiver 34 may receive its signals via a cable, and so the address detectors 620 and 640 are connected to the same TV distribution cable 602. The display 622 and 642, respectively, functions as the video recorder 40 and TV screen 2 of FIG. 1.

By way of illustration, the first subscriber, with telephone 628, wishes to call the second subscriber, with telephone 648. Telephone 628 is used as described above for telephone 6 of FIG. 1 to establish communication with the computer 601. A special number, for example 9, is dialed to tell the program 601 that it should not send weather data as in the example used to illustrate operation with the system of FIG. 1, but should, instead, serve this particular subscriber with picturephone service until a disconnection control number is received. The subscriber then dials the video address of the party he wishes to call, as it will be detected by address box 640. Conventional software is used to receive these control numbers, establish the references to the proper subroutines, and store the video addresses of both parties for subsequent use by the subroutines. The subscriber then uses conventional telephone-company procedures for establishing a conference-call circuit 660 for interconnecting his telephone 628 with telephone 648 of the party he wishes to call and with the computer 601.

When this connection is established, the parties can converse by telephone in the normal manner, but can also dial control numbers into the computer. One of the picturephone subroutines 603 will interpret these control numbers to set the timing rate for delivering picturephone service, as described subsequently. If the customer is billed, by conventional billing software, only for pictures actually transferred, then there will be no picture charge until the customer, after perhaps some preliminary conversation, dials a control number. He will then be charged only for the rate of pictures actually transferred, which will depend on the rate he requests, in combination with other traffic on the cable, as determined by conventional time-sharing scheduling routines.

Although a conference-call circuit 660 is shown, the subscriber could, instead, dial the timing rate that he desires when he first requests the computer to process the video addresses of himself and the called party. Then, when he hangs up, he merely telephones the called party in the normal manner, without requesting a conference call, and the picturephone program will already have been set up to run as requested. If desired, the computer can be provided with circuits to periodically sense for this subscriber's activity and provide the requested service only when activity is occurring, as described subsequently.

Now the timing-rate subroutine 603 indicates the desired rate to the main timing routine 605. This routine provides, in a conventional manner, the scheduling and initiation of the various services that have been requested by different subscribers, including the sending of general and special weather forecasts, and the like, as described in connection with FIG. 1.

When it is time to service the subscriber at the initiating address box 620, the timing routine 605 initiates the routine 607 to send the receiver address. This routine operates, much as the equivalent routine in FIG. 1, to send the video address control signal that initiates action at the called subscriber, 640. Accordingly, just as described in FIG. 1, the display 642 will record, and subsequently continuously display, the TV picture that is placed on the cable during the remainder of the scan time (field or frame time). However, the computer does not send any such picture. Instead, it immediately proceeds with routine 609 to send the camera address. This routine operates just as routine 607, except that it sends, on the very next TV scan line, the special address for the first subscribers's TV camera 626. The computer then sends no more signals on the cable for the remainder of the scan time. The subscriber's address box 620 has been supplying synchronizing signals on line 623 to the camera 626 so that the camera is ready to scan during the desired scan time.

When the address circuits 620 receive the special camera address, they operate as described in connection with FIG. 5, and, via line 621, activate the transmitter 624 for one scan time to place the scene viewed by camera 626 on the cable 602. Since neither the computer nor any other camera is transmitting on the cable during this scan time, and since address detector 640 and display 642 have already been turned on for this scan time, the picture from camera 626 is sent to display 642. Timing routine 605 will, then, during the next scan time, or some subsequent scan time, initiate subroutines 607 and 609 to send the appropriate addresses in the reverse order, so that a return picture will be sent back from camera 646 to display 622 in much the same way as described above. If desired, a simple detector can be connected to cable 602 at the computer 601 so that, using conventional techniques, a subroutine can interrogate the detector during a given scan time to discover whether or not the addressed camera did, in fact, transmit a signal during that time. The result of this interrogation can then be used by the timing routine 605 to determine whether the subscriber has started using the circuit, whether he has requested a different rate of service by periodically (manually or automatically) disabling his camera, or whether he has terminated the service by disabling the camera for longer than a normal period. In this manner, any number of subscribers connected to the same cable can participate in picturephone service at rates determined by the instantaneous load on the cable. It is not even necessary that both subscribers transmit on the same radio frequency channel, so long as the computer sends all addressing controls to a given subscriber on the channel over which the other subscriber will be transmitting. Or, for example, the subscriber may have his address decoder tuned to the computer frequency, while his recorder is tuned to the camera frequency.

FIG. 7 shows how this system can be expanded to use two or more cables to provide city-wide picturephone service. The system functions as described in connection with FIG. 6, with timing routine 705 and initiate subroutines 707 and 709, except that the subroutines are provided with conventional means to allow them to transmit their control signals on selected ones of two or more cables, and an additional subroutine 708 is used in a conventional manner to activiate the proper one of several transfer gates 734, 735 that are used, for example, to relay the signal that appears on one RF channel of line B and re-transmit it on the proper RF channel of line A during the required scan time.

The picturephone systems described in FIGS. 6 and 7 have assumed that reception occurs concurrently with transmission. In some applications, it is desired to send a message that need not arrive until some later time. FIG. 8 shows such a "mail delivery" application. In this application, the computer has associated with it a high-capacity recorder 822 such as a video disc recorder or a conventional system for digitizing video signals and storing them in computer bulk storage. The computer program has conventional routines 807 and 817 for controlling the recorder so that the computer can request the data on any given channel of any given cable or line 802 during a given TV scan time to be recorded on an addressed track or portion of the recorder 822, and so that it can subsequently also request the data on that same portion of the recorder to be played back on any given channel of any given line 804 during a given TV scan time.

To send a frame of "mail", a subscriber having equipment 650 of FIG. 6 dials the computer, dials the control digit, for example "8", that requests the timing and control program 805 of FIG. 8 to activate the mail subroutines, and then dials the video address of the intended recipient. Subroutine 805 then uses conventional storage-management techniques to find a vacant portion of recorder 822, enter into the subroutine's storage-management tables the destination-address now being assigned to this portion of the recorder, and then, when time is available, activate subroutine 807 to enable the recorder to record, on that portion, the next scan-time of data received on the channel and line 802 being used by the originating subscriber. Subroutine 809 then, as described for the equivalent subroutine 609 of FIG. 6, immediately sends the camera address of the originating subscriber so that one scan of data from his camera is placed on the cable, line 802. Consequently, the originating subscriber transmits one scene, such as a photograph, sketch, note, fingerprint, or other material that then becomes recorded on one portion of recorder 822 and identified with the recipient's video address via the storage-management tables.

If he wishes, the subscriber may then dial a number that indicates how long this data is to be saved before being destroyed. Otherwise, it will be saved for a standard period of time established for the system. Routine 805 uses conventional techniques to enter the duration desired, bill the subscriber accordingly, and destroy the data when time is up. At any time before expiration of this interval, the intended recipient may operate his equipment exactly as described in FIG. 1 except that instead of dialing a request for weather information, he dials "8" to request mail service, and then a "delivery" digit, for example "1", which indicates that he wishes to receive, not send, mail. Routine 805 then uses conventional techniques to consult its storage-management tables to discover what portion of recorder 822 contains data for this destination.

Subroutines 817 and 819 then operate in a way similar to 22 and 28 of FIG. 1 to transmit that scan from the recorder 822 to the subscriber's recorder and screen. And so in this manner, one frame of "mail" can be sent from one subscriber to another. When the receiving subscriber has seen this one frame, he may then dial "1" again, which indicates to subroutine 805 that the currently-selected frame is to be destroyed, and the next one is to be found and sent. Or he may hang up, indicating to subroutine 805 that the currently-selected frame is to be destroyed, but the status of all other waiting frames is not to be altered. Or he may dial some other digit that indicates to subroutine 805 that he now wishes to be billed for saving this frame for a period of time indicated by the number he has dialed, instead of having it destroyed by a subsequent dial of "1", or a hanging up. Subroutine 805 may use conventional techniques for identifying this saved frame for later recovery by using a code number assigned by either the subscriber or the subroutine. The subscriber may use this feature to build up his own file of data from mail received from elsewhere or that he sends "to himself". The subscriber may call for the frames of his mail, or from any other file, one at a time and record them on sequential parts of his own tape recorder. He can also plug in the output of his recorder, in place of his camera, to send to other subscribers, or to his own file in the computer, selected frames from prerecorded tape, from tape recorded "off the air", or tape used for capturing frames addressed to him.

Although particular embodiments of picturephone and mail service have been described, other methods of providing such service are within the scope of the present invention. For example: One-way picturephone or mail can occur between a station that has a camera but no recorder, and one that has a recorder but no camera. Any subscriber can switch his recorder and camera, separately, to any RF channel of any cable at his location under the direction of the computer, or according to some other procedure, in order to maximize the utility of the service to all subscribers or in order to accomplish some other purpose. Conventional privacy techniques, such as the use of secret code numbers or electronic scrambling, can be sued to avoid unauthorized access to, or destruction of, mail or other data. In particular, for example, instead of destroying a piece of mail on receipt of a simple signal, it might be desirable to have billing for a frame transferred to the recipient as soon as he sees that frame, and he will then be billed for saving that frame indefinitely until he follows some specific procedure for destroying it, such as dialing his own secret authorization code. The examples have shown use of a single computer, but conventional techniques could be used for interconnecting computers at distant locations and routing traffic to, or through, them to form a transcontinental, or larger, picturephone and mail system. Use of cables has been described here, but the system will also work for broadcasting through air or space if the subscribers with cameras are properly licensed, and if the computer makes proper allowances for any anticipated time delays such as those encountered on earth-moon, or even shorter, communications.

The additional function detector can also be used to set electronically the address selection switches of the user's generic address detector or specific address detector. Thus the system has tremendous inherent capability permitting interactions between the user and the central computer installation, and, if desired, between users. Individual users can be granted the power to force specific addresses upon other users through the use of the other users' additional function detector used as described above in connection with the cascaded address.

While the system of FIG. 1 was described in conjunction with a video disc recorder, block 30, the video information, as well as address information, can be stored in any other means, including means such as conventional core storage or bulk digital storage. If digital storage is utilized, each TV frame in storage can be a precoded frame originally coded to include the TV scan line address in binary code, the column address in binary code, and the text characters in ASCII American Standard Code for Information Interchange) code for each row of text characters to display. It can also be originally coded to include a place for the subscriber's address code by making the first such text row an "all zeros" TV address. This can consist of the ASCII characters for "space", "dash" and "eight spaces" written on a white background as the first 10 characters of a row before the text of the frame. The precoded frame can also include a similar row of "disconnect" data (with the same ASCII characters) to be transmitted after the text of the frame. For reasons discussed below, the remainder of the frame does not include any characters in the first two columns of any row. However, before the frame is transmitted, the computer installation software will insert the subscriber's TV address by using conventional techniques to, first, convert the string of eight binary digits of the TV address to a string of eight ASCII characters in which each zero is represented by ASCII "space", and each ONE by ASCII "dash", and, second, insert this string of characters into the frame in place of the eight spaces of the above-mentioned precoded all zeros subscriber's TV address, whose core location is determined in a conventional manner from a relative address that has been precoded in the frame as part of its auxiliary control data.

At this point, the frame, in core storage, is ready to transmit, and so the computer software causes it to be read out to a conventional commercially available television display system (TDS). Conventional output program routines perform this read-out. The TDS system may be any conventional system such as the Model 6600 disc controlled system manufactured by Data Disc Inc.

The TV frame is coded as set forth above for the following reasons: First, since no rows (except the two special ones above), contain characters in the first two columns, none of their scan lines will contain a control flag as specified in waveform a of FIG. 3 for addresses, since each column corresponds to a single 0.8 microsecond address-bit position in waveform a of FIG. 3. Second, on the two special rows that contain spaces and dashes on the white background, all the scan lines will be all white for the first 10 columns except for the one line that actually contains the "dash" mark, and so these all white lines also contain no control flag. Third, the "dash" marks will occur on only one scan line of the row. Fourth, for a scan line that contains the "dash" marks, the video signal will appear as in waveform a of FIG. 3, with each blank causing a "white" level and then each "dash" causing a "black" level. Fifth, the "subscriber's TV address" row will be sent, decoded by the subscriber's equipment as discussed in connection with FIG. 4, and used to start his recorder. Then the text will be transmitted and recorded, and, finally, the "disconnect" row will be sent, which (because of its control flag followed by all white) will be interpreted by the subscriber's equipment as not his address (because in this example, it is assumed that no subscriber will use an all white address code), and will cause recording to stop.

This process occurs during only one field of an interlaced frame, and, therefore, consists of only odd numbered lines or only even numbered lines. A conventional type I standard tape recorder typically will record all fields it receives, but, in frame-freeze playback, shows only one field on both the odd and even lines. Consequently, if only one field is addressed to a recorder, it will be recorded regardless of whether it is an "odd" or "even" field. Alternatively, some types of recorders record only one of each pair of fields it receives, and so for these recorders, the computer can send the same addressed field twice to assure that at least one of them will be recorded.

While particular operating modes have been described above, any of a variety of start-stop sequences may be utilized. For example, automatic cessation after writing one row, one field or one frame may be utilized. In this case, if a user is to record a longer interval than that in the automatic cessation program, more transmissions of the subscriber's address code must be generated, but a disconnect code need not be generated and sent. As another example, if in the system described above, a different subscriber's address code will be sent in time or a repeated transmission of the subscriber's frame is to occur, a disconnect code need not be sent.

Those skilled in communications techniques will recognize that following the teachings of the present invention a variety of methods may be utilized to generate single or multiple cascaded-address control codes for controlling cascade dependent subscriber's controls so that, for example, a group of special signals can be generated and sent at the start of any frame for presetting the control circuits of one or more specific subscribers to be receptive to certain frame address codes that will be sent for the same or subsequent one or more frames. Similarly, as indicated above, a subscriber, himself, can influence not only frames subsequently sent to him but frames to be stored or sent to other subscribers.

While several specific illustrative examples have been set forth above, those skilled in relevant arts will recognize that variations can be made without departing from the scope of the present invention. Similarly, while some of the described embodiments assume that the subscriber has equipment of the type presently coming on the market with home video recorders, the provision of the indicated connections for video inputs and outputs may be easily added by the ordinary television serviceman to any present-day television receiver.

Having thus described our invention, we claim:

1. A video information transfer system comprising video display means, means to receive signals for display by said video display means, means to identify particular portions of said received signals, means to record signals received by said signal receiving means, means activating said recording means during receipt of said identified signal portions, said activated recording means then recording the identified portion of the received video signals, and means utilizing said recorded portion to maintain on said video display the information contained within said identified signal portion, said identification means comprising at least first and second portions, said second portions serving to control functions associated with particular ones of said video display means, one of said first portions of the identification means comprising a primary identification means and an associated keying means, means for retaining said keying means for comparison with subsequently sent second portions, and means activating said controlled function upon receipt of a second portion corresponding to said retained keying means.

2. A video information transfer system comprising video display means, means to receive signals for display by said video display means, means to identify particular portions of said received signals, means to record signals received by said signal receiving means, means activating said recording means during receipt of said identified signal portions, said activated recording means then recording the identified portion of the received video signals, means utilizing said recorded portion to maintain on said video display the information contained within said identified signal portion, means associated with at least one identification means for originating and sending a user-originated video display to a video recording means, means responsive to said identification means for initiating the sending of at least a part of the video frame from said user-originated means, and means for routing said user-originated video frame to any required intermediate and final video recording means.

* * * * *

UNITED STATES PATENT OFFICE

CERTIFICATE OF CORRECTION

Patent No. 3,746,780 Dated July 17, 1973

Inventor(s) Kenneth J. Stetten, and Rollin P. Mayer

It is certified that error appears in the above-identified patent and that said Letters Patent are hereby corrected as shown below:

column 1, line 17 change "Illonois" to "Illinois"

column 8, line 23, change "206" to "106"

column 11, line 2, change "wiring" to "writing"

column 15, line 56, change "sued" to "used"

Signed and sealed this 5th day of March 1974.

(SEAL)
Attest:

EDWARD M.FLETCHER,JR.
Attesting Officer

C. MARSHALL DANN
Commissioner of Patents.